United States Patent
Kuninaka (10) Patent No.: US 12,319,103 B2
(45) Date of Patent: Jun. 3, 2025

(54) PNEUMATIC TIRE

(71) Applicant: The Yokohama Rubber Co., LTD., Tokyo (JP)

(72) Inventor: Mizuki Kuninaka, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 699 days.

(21) Appl. No.: 17/310,197

(22) PCT Filed: Dec. 25, 2019

(86) PCT No.: PCT/JP2019/051004
§ 371 (c)(1),
(2) Date: Jul. 26, 2021

(87) PCT Pub. No.: WO2020/158277
PCT Pub. Date: Aug. 6, 2020

(65) Prior Publication Data
US 2022/0169079 A1     Jun. 2, 2022

(30) Foreign Application Priority Data

Jan. 31, 2019 (JP) ................................. 2019-015711

(51) Int. Cl.
| | | |
|---|---|---|
| *B60C 11/00* | (2006.01) | |
| *B60C 3/04* | (2006.01) | |
| *B60C 9/00* | (2006.01) | |
| *B60C 9/18* | (2006.01) | |
| *B60C 9/20* | (2006.01) | |
| *B60C 9/22* | (2006.01) | |
| *B60C 11/13* | (2006.01) | |
| *B60C 19/00* | (2006.01) | |
| *B60C 11/03* | (2006.01) | |

(52) U.S. Cl.
CPC ............ *B60C 9/2009* (2013.01); *B60C 9/005* (2013.01); *B60C 9/22* (2013.01); *B60C 11/0083* (2013.01); *B60C 11/1376* (2013.01); *B60C 19/002* (2013.01); *B60C 2009/2067* (2013.01); *B60C 2011/0033* (2013.01); *B60C 2011/0341* (2013.01)

(58) Field of Classification Search
CPC ..................... B60C 11/0083; B60C 2011/0016
See application file for complete search history.

(56) References Cited

FOREIGN PATENT DOCUMENTS

| | | | |
|---|---|---|---|
| DE | 102014208551 A1 | | 11/2015 |
| EP | 2554617 | * | 2/2013 |
| EP | 3272551 | * | 1/2018 |
| GB | 527995 A | * | 10/1940 |
| JP | 7-40705 | * | 2/1995 |
| JP | 7-149113 A | | 6/1995 |

(Continued)

*Primary Examiner* — Justin R Fischer
(74) *Attorney, Agent, or Firm* — Thorpe North & Western (57) ABSTRACT

In a pneumatic tire, a tread average thickness A in a tire width direction region of a center land portion where a center cover layer is disposed, a tread average thickness B in a tire width direction region of the center land portion where the center cover layer is not disposed, and a tread average thickness C in tire width direction regions where second land portions located further on an outer side than the center land portion in a tire width direction and adjacent to the center land portion are defined and formed satisfy a relationship A<B<C.

11 Claims, 3 Drawing Sheets

(56) References Cited

FOREIGN PATENT DOCUMENTS

| | | | |
|---|---|---|---|
| JP | 9-58215 A | | 3/1997 |
| JP | 10-291403 A | | 11/1998 |
| JP | 10329511 | * | 12/1998 |
| JP | 2011-11690 A | | 1/2011 |
| JP | 2011-126304 A | | 6/2011 |
| JP | 2011-173564 A | | 9/2011 |
| JP | 2011-183879 A | | 9/2011 |
| JP | 2014-213639 A | | 11/2014 |
| JP | 2017-137032 A | | 8/2017 |
| WO | WO 98/58810 | * | 12/1998 |
| WO | 2003/035413 A1 | | 5/2003 |
| WO | 2015/111314 A1 | | 7/2015 |

\* cited by examiner

PNEUMATIC TIRE

TECHNICAL FIELD

The present technology relates to a pneumatic tire that provides both shock burst resistance performance and high-speed durability performance in a compatible manner.

BACKGROUND ART

An extra road tire is used at a relatively high air pressure, and thus during traveling, the tire may be greatly shocked and damaged (shock burst) due to, for example, breakage of a carcass. Thus, the extra road tire is required to ensure shock burst resistance performance.

In order to ensure shock burst resistance performance, a reinforcing layer may be provided in a region (the tire width direction center region) located near a tire equatorial plane on which the highest load is placed during traveling, the region including the tire equatorial plane. For example, a means is known in which a full cover layer is provided to completely cover a tire width direction region, on an outer side of a belt layer in a tire radial direction, and in which a center cover layer is provided in a tire width direction center region on an outer side of the full cover layer in the tire radial direction (see Japan Unexamined Patent Publication No. 2017-137032). Employing such a configuration allows the tire width direction center region to be locally reinforced on the outer side of the belt layer in the tire radial direction, ensuring shock burst resistance performance.

However, providing a center cover layer increases tread gauge in the center region. This markedly appears particularly in the extra road tire, which is used at a relatively high air pressure, and an excessive load is applied to the portion with the increased tread gauge, thus increasing the tire ground contact length and making the ground contact pressure in this portion significantly different from the ground contact pressure in the other portions. This may prevent excellent high-speed durability performance from being delivered.

In addition, in particular, in a case where a band-like sound absorbing member is installed in a tire cavity as in the technology disclosed in Japan Unexamined Patent Publication No. 2017-137032, heat accumulated in the band-like sound absorbing member at high speeds degrades the band-like sound absorbing member or a rubber layer disposed in proximity to the band-like sound absorbing member. This may prevent excellent high-speed durability performance from being delivered.

SUMMARY

The present technology provides a pneumatic tire that allows, when shock burst resistance performance is ensured, excellent high-speed durability performance to be delivered even in a case where a band-like sound absorbing member is installed in a tire cavity.

An embodiment of the present technology provides a pneumatic tire comprising a tread portion provided with two circumferential main grooves defining and forming a center land portions so as to include a tire equatorial plane, the tread portion comprising at least one full cover layer disposed on an outer side of a belt layer in a tire radial direction and covering the belt layer by entire width thereof and at least one center cover layer disposed on an outer side of the full cover layer in the tire radial direction and locally covering a central region of the belt layer in a tire width direction, a band-like sound absorbing member being formed on an inner side of an innerliner in the tire radial direction, and a tread average thickness A in a tire width direction region of the center land portion in which the center cover layer is disposed, a tread average thickness B in a tire width direction region of the center land portion in which the center cover layer is not disposed, and a tread average thickness C in second land portions located further on an outer side than the center land portion in the tire width direction and located adjacent to the center land portion satisfying a relationship A<B<C.

In the pneumatic tire according to an embodiment of the present technology, improvements are made to the tread average thickness in the center land portion and the second land portion. As a result, in the pneumatic tire according to an embodiment of the present technology, on the precondition that shock burst resistance performance is ensured, excellent high-speed durability performance can be delivered even in a case where a band-like sound absorbing member is installed in a tire cavity.

DETAILED DESCRIPTION

Pneumatic tires according to embodiments (including Basic Embodiment and Additional Embodiments 1 to 6) of the present technology are described below based on the drawings. Note that the present technology is not limited to these embodiments. Furthermore, constituents of the embodiment include elements that can be substituted or easily conceived by one skilled in the art or that are essentially identical. In addition, the various modes included in the embodiments can be combined as desired within the scope of obviousness by one skilled in the art.

Basic Embodiment

The following is a description of the Basic Embodiment of the pneumatic tire according to an embodiment of the present technology.

Herein, "tire radial direction" refers to the direction orthogonal to the rotation axis of the pneumatic tire. "inner side in the tire radial direction" refers to the direction toward the rotation axis in the tire radial direction. "outer side in the tire radial direction" refers to the direction away from the rotation axis in the tire radial direction. In addition, "tire circumferential direction" refers to the circumferential direction with the rotation axis as the center axis. "Tire width direction" refers to the direction parallel with the rotation axis. "inner side in the tire width direction" refers to the direction toward a tire equatorial plane CL (tire equator line) in the tire width direction. "outer side in the tire width direction" refers to the direction away from the tire equatorial plane CL in the tire width direction. Note that "tire equatorial plane CL" refers to the plane that is orthogonal to the rotation axis of the pneumatic tire and that passes through the center of the tire width of the pneumatic tire.

Figure 1:
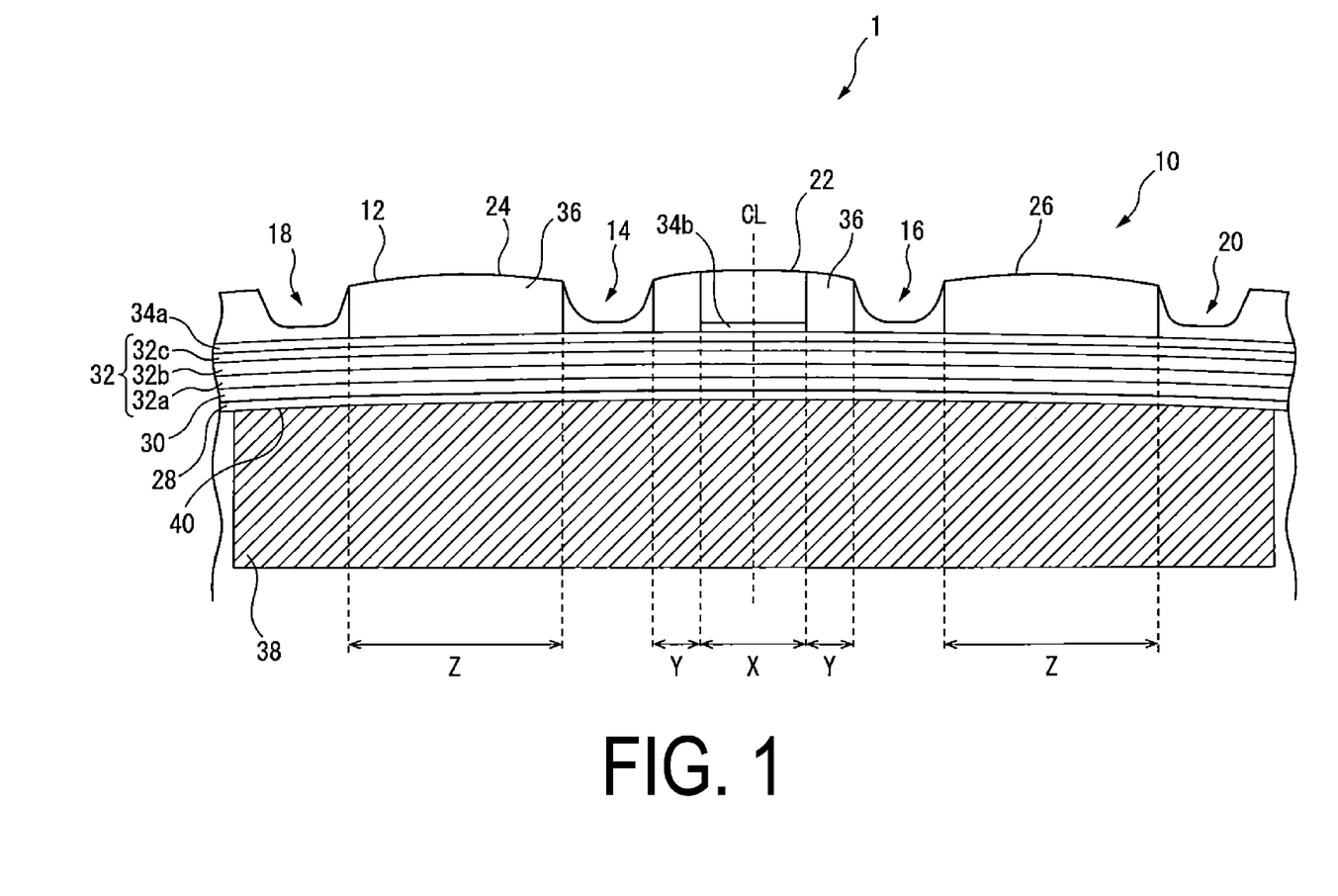
FIG. 1 is a tire cross-sectional view illustrating a tread portion of a pneumatic tire according to an embodiment of the present technology.

FIG. 1 is a tire meridian cross-sectional view illustrating a tread portion of a pneumatic tire according to an embodiment of the present technology. Additionally, the pneumatic tire illustrated in the same drawing is mounted on a regular rim and inflated to an air pressure of 180 kPa or more and 350 kPa or less, and loaded with from 50% to 95% of a regular load. Note that "meridian cross-sectional view of the pneumatic tire" is a view illustrating the cross-sectional shape of the pneumatic tire appearing on a plane normal to the tire equatorial plane.

Here, "regular rim" refers to a "standard rim" defined by JATMA (The Japan Automobile Tyre Manufacturers Association, Inc.), a "Design Rim" defined by TRA (The Tire and Rim Association, Inc.), or a "Measuring Rim" defined by ETRTO (The European Tyre and Rim Technical Organisation). Additionally, "regular load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

A pneumatic tire 1 illustrated in the same drawing includes a tread portion 10. The tread portion 10 is made of a rubber member (tread rubber) or the like and is located on the outermost side of the pneumatic tire 1 in the tire radial direction, with the surface of the tread portion 10 constituting the contour of the pneumatic tire 1. The surface of the tread portion is formed as a tread surface 12, corresponding to a surface that comes into contact with the road surface when a vehicle (not illustrated) equipped with the pneumatic tire is traveling.

As illustrated in FIG. 1, the tread surface 12 includes at least two land portions and in FIG. 1, three land portions 22, 24, 26 defined and formed by at least three circumferential main grooves and in FIG. 1, four circumferential main grooves 14, 16, 18, 20.

Here, "circumferential main groove" refers to a groove having a groove width (maximum width) of 7.5 mm or more and 8.5 mm or less, and a groove depth (maximum groove depth) of 7.0 mm or more and 8.5 mm or less.

Additionally, for three circumferential main grooves (not illustrated), the two land portions located in the central portion in the tire width direction correspond to the center land portion, and the land portion closest to the center land portion on the outer side in the tire width direction correspond to the second land portion. Additionally, in a case where four circumferential main grooves are present (as illustrated in FIG. 1), the one land portion 22 located in the central portion in the tire width direction corresponds to the center land portion, and the land portions 24, 26 closest to the center land portion on the outer side in the tire width direction correspond to the second land portions. Furthermore, in a case where five circumferential main grooves are present (not illustrated), the two land portions located in the central portion in the tire width direction correspond to the center land portions, and the land portions closest to the center land portions on the outer side in the tire width direction correspond to the second land portions. Note that both the center land portions and the second land portions may be either so-called ribs or so-called blocks.

Additionally, in the pneumatic tire according to the present embodiment, as illustrated in FIG. 1, an innerliner 28, a carcass layer 30, a belt layer 32 (belts 32a to 32c), a belt cover layer 34 (a full cover layer 34a and a center cover layer 34b), and a tread rubber layer 36 are provided in this order from the inner side toward the outer side in the tire radial direction.

In other words, on the outer side in the tire radial direction of the belt layer 32, at least one full cover layer covering the belt layer 32 by entire width thereof is disposed, and in FIG. 1, one full cover layer 34a is disposed. Additionally, on the outer side of the full cover layer 34a in the tire radial direction, at least one center cover layer 34b locally covering a central region of the belt layer 32 in the tire width direction is disposed, and in FIG. 1, one center cover layer 34b is disposed.

Furthermore, in the pneumatic tire according to the present embodiment, a band-like sound absorbing member 38 is formed on the inner side of the innerliner 28 in the tire radial direction, as illustrated in FIG. 1. The band-like sound absorbing member 38 is formed from a porous material with open cells, and has predetermined sound absorbing properties based on the porous structure. For example, polyurethane foam can be used as the porous material constituting the band-like sound absorbing member 38. The band-like sound absorbing member 38 is bonded to the innerliner 28 via, for example, an adhesive layer 40 to a region on the tire inner surface corresponding to the tread portion 10. For example, a double-sided tape is preferably used as the adhesive layer 40.

On such preconditions, in the pneumatic tire according to the present embodiment, a tread average thickness A in a tire width direction region X of the center land portion 22 where the center cover layer 34b is disposed; a tread average thickness B in tire width direction regions Y of the center land portion 22 where the center cover layer 34b is not disposed; and a tread average thickness C in tire width direction regions Z where the second land portions 24, 26 located further on an outer side than the center land portion 22 in the tire width direction and adjacent to the center land portion 22 are defined and formed satisfy a relationship A<B<C.

Here, "tread average thicknesses A, B, C" respectively refer to the average thicknesses from the innermost position of the innerliner 28 in the tire radial direction to the tire surface, in the tire width direction region X of the center land portion 22, the tire width direction regions Y, Y of the center land portion 22, and the tire width direction regions Z, Z of the second land portions 24, 26, respectively. Note that the average thicknesses A, B, and C are calculated by measuring the following sections. In other words, for the average thickness A, three sections are measured including both end positions of the center cover layer 34b in the tire width direction and the central position between the end positions in the tire width direction. For the average thickness B, three sections measured including two sections corresponding to both end positions of the tire width direction region Y in the tire width direction and the central position between the end positions in the tire width direction. For the average thickness C, three sections are measured including both end positions of the tire width direction region Z in the tire width direction and the central position between the end positions in the tire width direction.

Effects

In the pneumatic tire according to the present embodiment, as illustrated in FIG. 1, the center cover layer 34b that locally covers the central region of the belt layer 32 in the tire width direction is provided on the outer side of the full cover layer 34a in the tire radial direction. This allows reinforcement of the tire width direction center region to which the heaviest load is applied during traveling, allowing shock burst resistance performance to be ensured (effect 1).

Additionally, in the pneumatic tire according to the present embodiment, as illustrated in FIG. 1, the band-like sound absorbing member 38 is installed in the tire cavity, and thus heat accumulated in the band-like sound absorbing member 38 at high speeds is assumed to degrade the band-like sound absorbing member 38 and the rubber layer disposed in proximity to the band-like sound absorbing member 38. However, in the pneumatic tire according to this embodiment, as illustrated in FIG. 1, the tread average thicknesses A, B in the center land portion 22 are fluctuated in the tire width direction (A<B), and the tread average thicknesses B, C in the center land portion 22 and the second land portions 24, 26 are also fluctuated in the tire width direction (B<C). Specifically, in the pneumatic tire illustrated in FIG. 1, the tread average thickness is gradually increased from the tire equatorial plane CL toward the outer side in the tire width direction (A<B<C). Accordingly, during traveling, the tire width direction center region is prevented from protruding excessively outward, thus allowing suppression of an increase in the tire ground contact length and suppression of a difference in the ground contact pressure between the tire width direction center region and the other regions. This in turn allows excellent high-speed durability performance to be delivered (effect 2).

As described above, in the pneumatic tire according to the present embodiment, on the precondition that, by improving the tread average thicknesses in the center land portion and the second land portions, shock burst resistance performance is ensured (effect 1 described above), even in a case where the band-like sound absorbing member is installed in the tire cavity, excellent high-speed durability performance can be delivered (effect 2 described above). This allows both shock burst resistance performance and high-speed durability performance to be achieved at a high level in a compatible manner.

Note that the pneumatic tire according to the present embodiment, like a known pneumatic tire not illustrated, includes a bead portion, a sidewall portion, and a tread portion in this order from inner side to outer side in the tire radial direction in a tire meridian cross-sectional view. The pneumatic tire includes, for example, in a tire meridian cross-sectional view, a carcass layer (member with reference sign 30 in FIG. 1) that extends from the tread portion to the bead portions on both sides and is wound around a pair of bead cores, a belt layer and other layers (member with reference sign 32 in FIG. 1) sequentially formed on the outer side of the carcass layer in the tire radial direction.

Also, the pneumatic tire according to the present embodiment is obtained after carrying out the various normal manufacturing processes, in other words, a step of mixing the tire materials, a step of processing the tire materials, a step of molding the green tire, a vulcanization step, an inspection step after vulcanization, and the like. In a case where the pneumatic tire according to the present embodiment is manufactured, in particular desired circumferential main grooves and protrusion portions corresponding to land portions are formed on an inner wall of a vulcanization mold, which is used to perform vulcanization.

ADDITIONAL EMBODIMENTS

Now, Additional Embodiments 1 to 6 that can optionally be implemented on Basic Embodiment of the pneumatic tire according to an embodiment of the present technology will be described.

Additional Embodiment 1

In Basic Embodiment, a ratio A/B of the tread average thickness A and the tread average thickness B is preferably not less than 0.70 and not less than 0.95 (Additional Embodiment 1). Setting the ratio A/B to 0.7 or more allows setting of an even larger tread average thickness A in the tire width direction region X including the tire equatorial plane and located closest to the central portion in the tire width direction. Thus, even in a case where the region X is greatly shocked during traveling, a shock burst can be suppressed at a higher level.

In contrast, setting the ratio A/B to 0.95 or less allows suppression of protrusion of the region X in the tire radial direction during traveling, and allows avoidance of a significant difference in ground contact pressure from the other portions (particularly the tire width direction region Y) without causing an excess tire ground contact length. Thus, excellent high-speed durability performance can be delivered.

Note that in a case where the ratio A/B is 0.85 or more and 0.90 or less, the above-described effects are preferably produced at even higher levels.

Additional Embodiment 2

In Basic Embodiment or an embodiment corresponding to Basic Embodiment to which Additional Embodiment 1 is added, a ratio B/C of the tread average thickness B and the tread average thickness C is preferably 0.91 or more and 0.99 or less (Additional Embodiment 2). Setting the ratio B/C to 0.91 or more allows setting of an even larger tread average thickness B in the tire width direction region Y that is relatively close to the tire equatorial plane CL. Thus, even in a case where the region Y is greatly shocked during traveling, a shock burst can be suppressed at a higher level.

In contrast, by setting the ratio B/C to 0.99 or less, not only is the protrusion of the region Y in the tire radial direction during traveling further reduced to further suppress an increase in the tire ground contact length, but also a significant difference in ground contact pressure from the other portions (particularly the tire width direction region Z) is avoided to suppress heat build-up. Thus, more excellent high-speed durability performance can be delivered.

Note that in a case where the above-described ratio B/C is 0.93 or more and 0.97 or less, the above-described effects are preferably produced at even higher levels.

Additional Embodiment 3

In Basic Embodiment or an embodiment corresponding to Basic Embodiment to which at least one of Additional Embodiment 1 and Additional Embodiment 2 is added, in a case where the two circumferential main grooves located on both sides of each of the center land portion and the second land portion in the tire width direction include four tire width direction end points and a contour line of the tread surface corresponds to an arc passing through at least three of the four tire width direction end points, the three tire width direction end points including two points by which the land portion is demarcated, the arc including the center on the inner side in the tire radial direction, then tire profile lines of both center land portion and second land portion project outward in the tire radial direction with respect to the contour line of the tread surface, the projection amount of the center land portion is less than the projection amount of the second land portion, and a ratio between the projection amount of the center land portion and the projection amount of the second land portion is 0.50 or more and 0.70 or less (Additional Embodiment 3).

Figure 2:
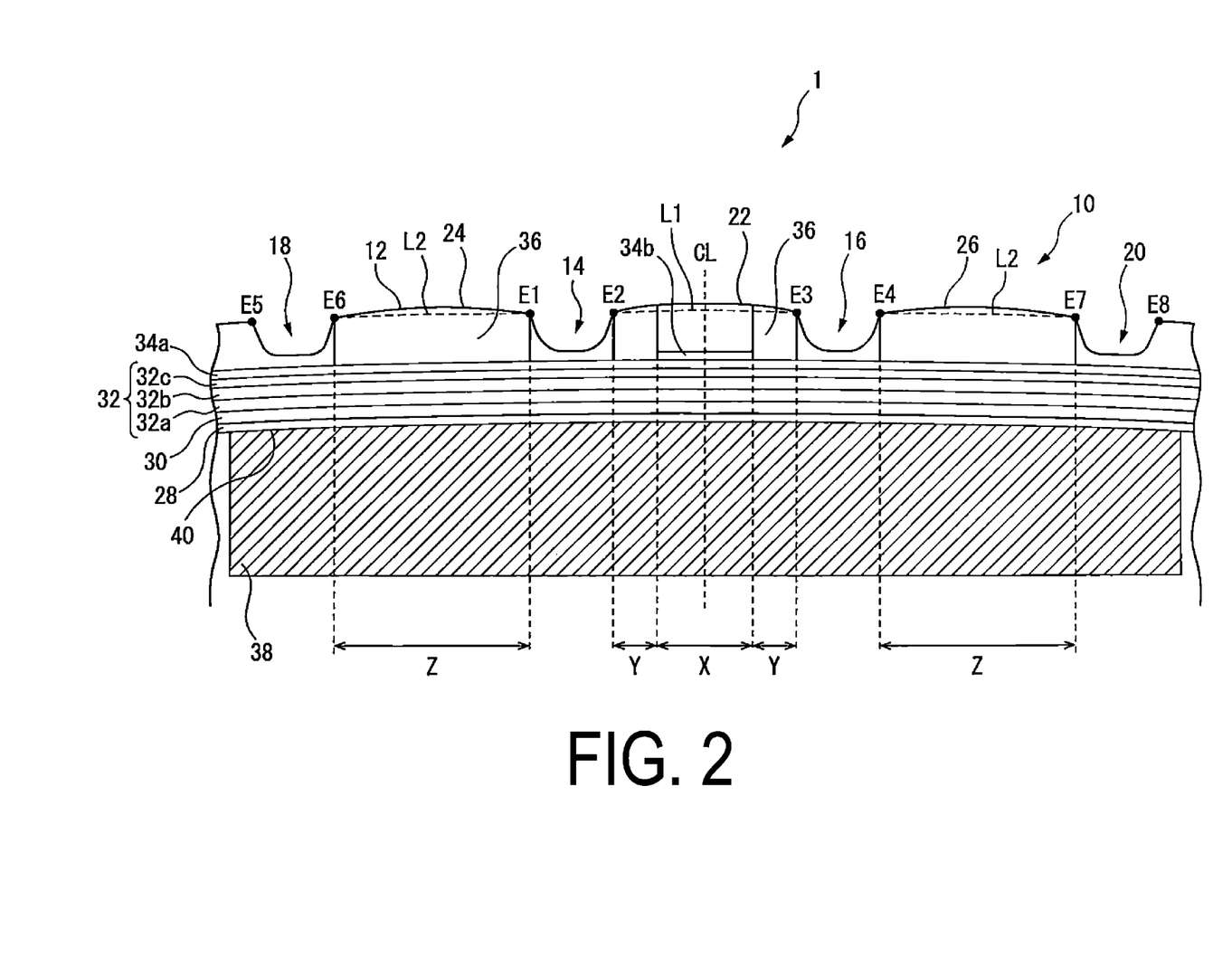
FIG. 2 is a tire meridian cross-sectional view illustrating a tread portion of a pneumatic tire according to an embodiment of the present technology.

FIG. 2 is an enlarged meridian cross-sectional view illustrating a region of the tread surface of FIG. 1. As illustrated in FIG. 2, the two circumferential main grooves 14, 16 located on both sides in the tire width direction of the center land portion 22 include four tire width direction end points E1, E2, E3, E4, and a contour line L1 of the tread surface corresponds to an arc including the two points E2, E3 by which the center land portion 22 is demarcated and further including at least one of the end points E1, E4 (in the example illustrated in FIG. 2, the arc including all of the end points E1 to E4). At this time, the tire profile line (solid line in FIG. 2) of the center land portion 22 projects outward in the tire radial direction with respect to the contour line L1 of the tread surface.

Similarly, as illustrated in FIG. 2, the two circumferential main grooves 18, 14 (16, 20) located on both sides in the tire width direction of the second land portion 24 (26) include four tire width direction end points E5, E6, E1, E2 (E3, E4, E7, E8), and a contour line L2 (L2) of the tread surface corresponds to an arc including the two points E6, E1 (E4, E7) by which the second land portion 24 (26) is demarcated and further including at least one of the end points E5, E2 (E3, E8) (in the example illustrated in FIG. 2, the arc including all of the end points E5, E6, E1, E2 (E3, E4, E7, E8)). In this case, the tire profile line (solid line in FIG. 2) of the second land portion 24 (26) projects outward in the tire radial direction with respect to the contour line L2 (L2) of the tread surface.

In this regard, for the center land portion 22, a projection amount Pc of the center land portion refers to the maximum projection amount outward in the tire radial direction from the contour line L1 of the tread surface to the tire profile line (solid line in FIG. 2), as illustrated in FIG. 2. Similarly, for the second land portion 24 (26), a projection amount Ps of the second land portion refers to the maximum projection amount outward in the tire radial direction from the contour line L2 (L2) of the tread surface to the tire profile line (solid line in FIG. 2).

On these preconditions, in the example illustrated in FIG. 2, a ratio Pc/Ps between the projection amount Pc of the center land portion 22 and the projection amount Ps of the second land portion 24 (26) is 0.50 or more and 0.70 or less.

The ratio Pc/Ps between both projection amounts being 0.50 or more enables avoidance of a significant difference in ground contact pressures between the center land portion 22 and the second land portion 24 (26) to suppress heat build-up, and further allows excellent high-speed durability performance to be delivered.

In contrast, the ratio Pc/Ps between both projection amounts being 0.70 or less allows further suppression of protrusion of the tire width direction center region, allowing even further suppression of an increase in the tire ground contact length. This enables suppression of a difference in the ground contact pressure between the tire width direction region X and the tire width direction region Y, thus allowing excellent high-speed durability performance to be delivered.

Note that in a case where the ratio Pc/Ps is 0.55 or more and 0.65 or less, the above-described effects are more preferably produced at higher levels.

Additional Embodiment 4

Preferably, in an embodiment corresponding to the Basic Embodiment to which at least Additional Embodiment 3 is added, in a case where the center cover layer 34b illustrated in FIG. 2 has a thickness of 0.10 mm or more and 0.40 mm or less, the projection amount Pc of the center land portion 22 is 0.05 mm or more and 0.20 mm or less, and in a case where the center cover layer 34b has a thickness of 0.40 mm or more and 1.00 mm or less, the projection amount Pc of the center land portion 22 is 0.25 mm or more and 0.50 mm or less, and in a case where the center cover layer 34b has a thickness of 1.00 mm or more and 1.50 mm or less, the projection amount Pc of the center land portion 22 is 0.50 mm or more and 0.75 mm or less (Additional Embodiment 4).

As described above, by specifying, in a coordinative manner, the thickness of the center cover layer 34b and the projection amount Pc of outward projection of the center land portion 22 in the tire radial direction, a certain projection amount Pc of the center land portion 22 is ensured with respect to the thickness of the center cover layer 34b, allowing shock burst resistance performance to be achieved at a higher level.

In contrast, protrusion of the center land portion 22 in the tire radial direction during traveling is suppressed without an excessive increase in the projection amount Pc of the center land portion 22 with respect to the thickness of the center cover layer 34b, and a significant difference in the ground contact pressure from the second land portion 24 (26) is avoided, suppressing heat build-up. This allows more excellent high-speed durability performance to be delivered.

Additional Embodiment 5

In Basic Embodiment or an embodiment corresponding to Basic Embodiment to which Additional Embodiment 1 or the like is added, the center cover layer 34b illustrated in FIGS. 1 and 2 preferably includes organic fiber cords of nylon and aramid intertwined (Additional Embodiment 5). The center cover layer 34b includes organic fiber cords formed by intertwining nylon having a relatively high elongation and aramid having a relatively high strength, allowing an excessive ground contact length to be suppressed compared to the center cover layer 34b including steel cords. Additionally, deflection of the tread portion can be suppressed, reducing heat build-up, and thus high-speed durability performance can be efficiently improved.

Additional Embodiment 6

In Basic Embodiment or an embodiment corresponding to Basic Embodiment to which Additional Embodiment 1 or the like is added, the band-like sound absorbing member 38 illustrated in FIGS. 1 and 2 is preferably discontinuous in at least one section in the tire circumferential direction (Additional Embodiment 6).

Figure 3:
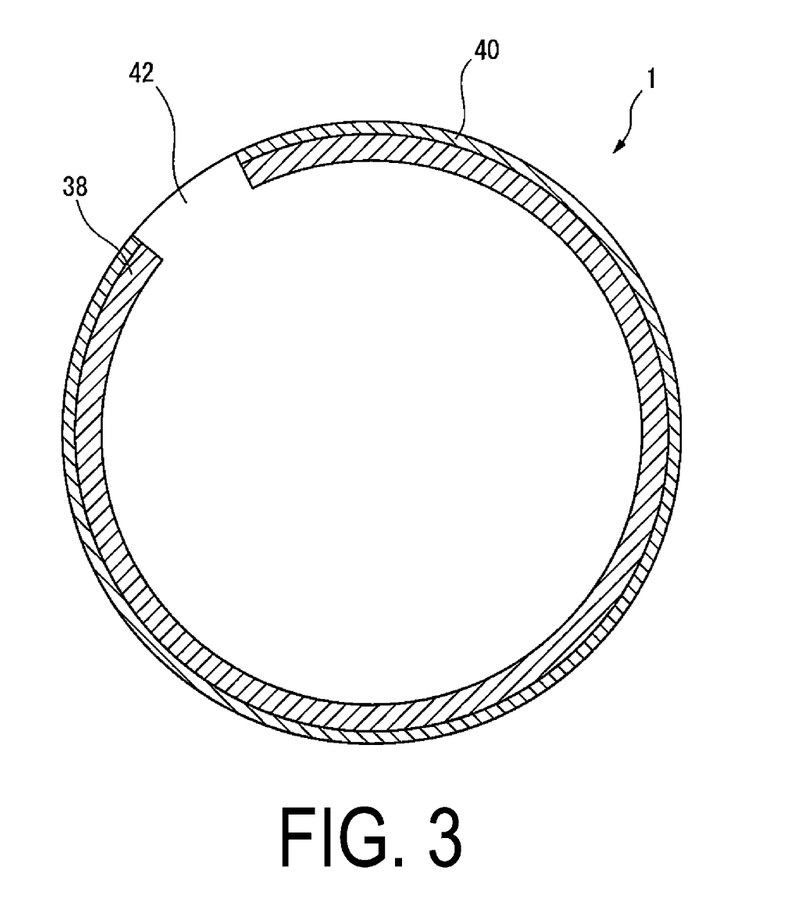
FIG. 3 is a tire side cross-sectional view illustrating a pneumatic tire according to an embodiment of the present technology.

FIG. 3 is a tire side cross-sectional view illustrating a pneumatic tire according to an embodiment of the present technology. FIG. 3 illustrates only the portion of the pneumatic tire 1 illustrated in FIGS. 1 and 2 which is located further on the inner side than the innerliner 28 in the tire radial direction, and the band-like sound absorbing member 38 is attached to the tire inner cavity via the adhesive 40. As illustrated in FIG. 1, one section of the band-like sound absorbing member 38 in the tire circumferential direction is discontinuous, and this portion corresponds to a gap portion 42.

The band-like sound absorbing member 38 is discontinuous in at least one section in the tire circumferential direction to define the gap portion 42. Thus, in a tire rolling state in which the tire is filled with air and loaded, the shear strain on the adhering surface at which the band-like sound absorbing member 38 is bonded to the innerliner can be alleviated. Accordingly, heat build-up between the band-like sound absorbing member 38 and the innerliner 28 can be suppressed, allowing more excellent high-speed durability performance to be delivered.

Examples

Manufacture of Test Tires

Pneumatic tires according to Conventional Example, Comparative Examples 1 and 2, and Examples 1 to 7 were manufactured. The tires have a tire size of 275/40R21 107Y, include the components illustrated in FIG. 1 (innerliner 28, carcass layer 30, belt layer 32 (belts 32a to 32c), belt cover layer 34 (full cover layer 34a and center cover layer 34b), tread rubber layer 36, and band-like sound absorbing member 38), and the center land portion 22 and the second land portion 24 (26) illustrated in FIG. 1, and satisfy conditions indicated in Tables 1 and 2 below.

Here, in Tables 1 and 2 below, the tread average thickness A is the tread average thickness in the tire width direction region X of the center land portion 22 where the center cover layer 34b is disposed as illustrated in FIG. 2, the tread average thickness B is the tread average thickness in the tire width direction region Y of the center land portion 22 where the center cover layer 34b is not disposed as illustrated in FIG. 2, and the tread average thickness C is the tread average thickness in the tire width direction region Z where the second land portion 24 (26) located further on the outer side than the center land portion 22 in the tire width direction and adjacent to the center land portion 22 is defined and formed as illustrated in FIG. 2. Additionally, Pc denotes a maximum projection amount of outward projection of the center land portion 22 in the tire radial direction from the contour line L1 of the tread surface to the tire profile line (solid line in FIG. 2) as illustrated in FIG. 2, and Ps denotes a maximum projection amount of outward projection of the second land portion 24 (26) in the tire radial direction from the contour line L2 of the tread surface to the tire profile line (solid line in FIG. 2) as illustrated in FIG. 2.

TABLE 1

| | Conventional Example | Comparative Example 1 | Comparative Example 2 | Example 1 | Example 2 |
|---|---|---|---|---|---|
| Tread average thickness Relationship between A and B and C | A > B < C | A < B > C | A > B > C | A < B < C | A < B < C |
| Ratio A/B | 1.05 | 0.65 | 1.05 | 0.65 | 0.75 |
| Ratio B/C | 0.88 | 1.02 | 1.02 | 0.88 | 0.88 |
| Ratio Pc/Ps | 0.45 | 0.45 | 0.45 | 0.45 | 0.45 |
| Thickness of center cover layer (mm), projection amount Pc (mm) | 0.70 0.20 | 0.70 0.20 | 0.70 0.20 | 0.70 0.20 | 0.70 0.20 |
| Cord type used in center cover layer | Organic fibers Cords Nylon | Organic fibers Cords Nylon | Organic fibers Cords Nylon | Organic fibers Cords Nylon | Organic fibers Cords Nylon |
| Whether band-like sound absorbing member is discontinuous | Continuous | Continuous | Continuous | Continuous | Continuous |

TABLE 2

| | Example 3 | Example 4 | Example 5 | Example 6 | Example 7 |
|---|---|---|---|---|---|
| Tread average thickness Relationship between A and B and C | A < B < C | A < B < C | A < B < C | A < B < C | A < B < C |
| Ratio A/B | 0.75 | 0.75 | 0.75 | 0.75 | 0.75 |
| Ratio B/C | 0.97 | 0.97 | 0.97 | 0.97 | 0.97 |
| Ratio Pc/Ps | 0.45 | 0.55 | 0.55 | 0.55 | 0.55 |
| Thickness of center cover layer (mm), and projection amount Pc (mm) | 0.70 0.20 | 0.70 0.20 | 0.70 0.35 | 0.70 0.35 | 0.70 0.35 |

TABLE 2-continued

|  | Example 3 | Example 4 | Example 5 | Example 6 | Example 7 |
|---|---|---|---|---|---|
| Cord type used in center cover layer | Organic fibers Cords Nylon | Organic fibers Cords Nylon | Organic fibers Cords Nylon | Organic fibers Cords Nylon and aramid | Organic fibers Cords Nylon and aramid |
| Whether band-like sound absorbing member is discontinuous | Continuous | Continuous | Continuous | Continuous | Discontinuous Gap portion present |

Evaluation of Shock Burst Resistance Performance

The test tires were assembled on wheels having a rim size of 21×9.5J (ETRO standard rim) and inflated to an air pressure of 220 kPa (Reinforced/Extra Load Tires). Tire failure tests (in compliance with JIS K 6302) were conducted in which a plunger with a plunger diameter of 19±1.6 mm was pressed against the central portion of the tread under a load speed (plunger pressing speed) of 50.0±1.5 m/min, and tire strength (tire failure energy) was measured. The actual value (unit: j) of the measured failure energy was converted into an index with Conventional Example being assigned as the reference (100). Larger values indicate higher failure energy and excellent shock burst resistance (Tables 3, 4).

Evaluation of High-Speed Durability Performance

Next, each of the test tires described above was set in an indoor drum testing machine (drum radius: 854 mm), inflated to an air pressure of 360 kPa, and loaded with a load of 7.26 kN. Pre-running was performed at a speed of 50 km/hr for 30 minutes, and then with the load set to 7.26 kN, the speed was gradually increased from 260 km/hr by 10 km/hr per 10 minutes. The speed at the time of tire failure was measured. Here, "time of tire failure" refers to the point in time when rubber and a cord or rubber and rubber were confirmed peeled off and damaged. Index evaluation was conducted based on the measured speeds with Conventional Example being assigned as the reference (100). In the evaluation, larger index values indicate higher speeds at the time of tire failure and more excellent high-speed durability performance (Tables 3, 4).

TABLE 3

|  | Conventional example | Comparative Example 1 | Comparative Example 2 | Example 1 | Example 2 |
|---|---|---|---|---|---|
| Shock burst resistance performance | 100 | 97 | 100 | 100 | 103 |
| High-speed durability performance | 100 | 94 | 91 | 103 | 103 |

TABLE 4

|  | Example 3 | Example 4 | Example 5 | Example 6 | Example 7 |
|---|---|---|---|---|---|
| Shock burst resistance performance | 106 | 106 | 108 | 110 | 110 |
| High-speed durability performance | 106 | 108 | 108 | 108 | 110 |

According to Tables 1 to 4, all of the pneumatic tires in Examples 1 to 7, which belong to the technical scope of the present technology (where the tread average thicknesses A, B, C satisfy the predetermined relationship) achieve both shock burst resistance performance and high-speed durability performance at a higher level than the pneumatic tires in Conventional Example and Comparative Examples 1 and 2, which do not belong to the technical scope of the present technology.

The invention claimed is:

1. A pneumatic tire, comprising:
a tread portion provided with at least three circumferential main grooves defining and forming a center land portion so as to include a tire equatorial plane,
the tread portion comprising at least one full cover layer disposed on an outer side of a belt layer in a tire radial direction and covering the belt layer by entire width thereof and at least one center cover layer disposed on an outer side of the full cover layer in the tire radial direction and locally covering a central region of the belt layer in a tire width direction,
a band-like sound absorbing member being formed on an inner side of an innerliner in the tire radial direction, and
a tread average thickness A in a tire width direction region of the center land portion in which the center cover layer is disposed, a tread average thickness B in a tire width direction region of the center land portion in which the center cover layer is not disposed, and a tread average thickness C in second land portions located further on an outer side than the center land portion in the tire width direction and located adjacent to the center land portion satisfying a relationship A<B<C, wherein
a ratio A/B between the tread average thickness A and the tread average thickness B is 0.70 or more and 0.90 or less.

2. The pneumatic tire according to claim 1, wherein a ratio B/C between the tread average thickness B and the tread average thickness C is 0.91 or more and 0.99 or less.

3. The pneumatic tire according to claim 1, wherein in a case where two of the circumferential main grooves located on both sides of each of the center land portion and the second land portion in the tire width direction comprise four tire width direction end points and a contour line of a tread surface corresponds to an arc passing through at least three of the four tire width direction end points, the three tire width direction end points comprising two points by which the land portion is demarcated, the arc comprising a center on the inner side in the tire radial direction,
tire profile lines of both center land portion and second land portion project outward in the tire radial direction with respect to the contour line of the tread surface, and a ratio between a projection amount of the center land portion and a projection amount of the second land portion is 0.50 or more and 0.70 or less.

4. The pneumatic tire according to claim 3, wherein in a case where the center cover layer has a thickness of 0.10 mm or more and 0.40 mm or less, the projection amount of the center land portion is 0.05 mm or more and 0.20 mm or less, in a case where the center cover layer has a thickness of 0.40 mm or more and 1.00 mm or less, the projection amount of the center land portion is 0.25 mm or more and 0.50 mm or less, and in a case where the center cover layer has a thickness of 1.00 mm or more and 1.50 mm or less, the projection amount of the center land portion is 0.50 mm or more and 0.75 mm or less.

5. The pneumatic tire according to claim 1, wherein the center cover layer comprises organic fiber cords of nylon and aramid intertwined.

6. The pneumatic tire according to claim 1, wherein the band-like sound absorbing member is discontinuous in at least one section in a tire circumferential direction.

7. The pneumatic tire according to claim 1, wherein a ratio B/C between the tread average thickness B and the tread average thickness C is 0.91 or more and 0.99 or less.

8. The pneumatic tire according to claim 7, wherein in a case where two of the circumferential main grooves located on both sides of each of the center land portion and the second land portion in the tire width direction comprise four tire width direction end points and a contour line of a tread surface corresponds to an arc passing through at least three of the four tire width direction end points, the three tire width direction end points comprising two points by which the land portion is demarcated, the arc comprising a center on the inner side in the tire radial direction, tire profile lines of both center land portion and second land portion project outward in the tire radial direction with respect to the contour line of the tread surface, and a ratio between a projection amount of the center land portion and a projection amount of the second land portion is 0.50 or more and 0.70 or less.

9. The pneumatic tire according to claim 8, wherein in a case where the center cover layer has a thickness of 0.10 mm or more and 0.40 mm or less, the projection amount of the center land portion is 0.05 mm or more and 0.20 mm or less, in a case where the center cover layer has a thickness of 0.40 mm or more and 1.00 mm or less, the projection amount of the center land portion is 0.25 mm or more and 0.50 mm or less, and in a case where the center cover layer has a thickness of 1.00 mm or more and 1.50 mm or less, the projection amount of the center land portion is 0.50 mm or more and 0.75 mm or less.

10. The pneumatic tire according to claim 9, wherein the center cover layer comprises organic fiber cords of nylon and aramid intertwined.

11. The pneumatic tire according to claim 10, wherein the band-like sound absorbing member is discontinuous in at least one section in a tire circumferential direction.

* * * * *